US008504558B2

(12) United States Patent
Agarwal et al.

(10) Patent No.: US 8,504,558 B2
(45) Date of Patent: Aug. 6, 2013

(54) FRAMEWORK TO EVALUATE CONTENT DISPLAY POLICIES

(75) Inventors: Deepak Agarwal, San Jose, CA (US); Pradheep Elango, Mountain View, CA (US); Raghu Ramakrishnan, Santa Clara, CA (US); Seung-Taek Park, San Jose, CA (US); Bee-Chung Chen, Mountain View, CA (US)

(73) Assignee: Yahoo! Inc., Sunnyvale, CA (US)

(*) Notice: Subject to any disclaimer, the term of this patent is extended or adjusted under 35 U.S.C. 154(b) by 852 days.

(21) Appl. No.: 12/184,114

(22) Filed: Jul. 31, 2008

(65) Prior Publication Data

US 2010/0030717 A1    Feb. 4, 2010

(51) Int. Cl.
*G06F 17/30* (2006.01)

(52) U.S. Cl.
USPC .......................................... 707/721; 707/758

(58) Field of Classification Search
USPC ...... 707/748, 754, 803, 1/1, 758, 721; 706/12, 706/59, 64
See application file for complete search history.

(56) References Cited

U.S. PATENT DOCUMENTS

| 5,446,891 | A | 8/1995 | Kaplan et al. |
| 5,727,129 | A | 3/1998 | Barrett et al. |
| 5,754,938 | A | 5/1998 | Herz et al. |
| 5,754,939 | A | 5/1998 | Herz et al. |
| 5,761,662 | A | 6/1998 | Dasan |
| 5,835,087 | A | 11/1998 | Herz et al. |
| 5,890,152 | A | 3/1999 | Rapaport et al. |
| 5,918,014 | A | 6/1999 | Robinson |
| 5,937,397 | A | 8/1999 | Callaghan |
| 6,029,195 | A | 2/2000 | Herz |
| 6,092,049 | A | 7/2000 | Chislenko et al. |
| 6,134,532 | A | 10/2000 | Lazarus et al. |
| 6,202,058 | B1 | 3/2001 | Rose et al. |
| 6,438,579 | B1 | 8/2002 | Hosken |
| 6,728,706 | B2 | 4/2004 | Aggarwal et al. |
| 7,035,825 | B1 * | 4/2006 | Sturtevant et al. ............... 705/51 |
| 7,117,208 | B2 * | 10/2006 | Tamayo et al. ............... 707/777 |
| 7,493,329 | B2 * | 2/2009 | McMullen et al. ................ 1/1 |
| 7,584,165 | B2 * | 9/2009 | Buchan ........................... 706/60 |
| 7,594,189 | B1 * | 9/2009 | Walker et al. ................. 715/811 |

(Continued)

OTHER PUBLICATIONS

International Search Report for PCT application No. PCT/US2010/041960 with written report, dated Feb. 18, 2011, 9 pages.

(Continued)

*Primary Examiner* — James Trujillo
*Assistant Examiner* — Thong Vu
(74) *Attorney, Agent, or Firm* — Hickman Palermo Truong Becker Bingham Wong LLP

(57) ABSTRACT

Content display policies are evaluated using two kinds of methods. In the first kind of method, using information, collected in a "controlled" manner about user characteristics and content characteristics, truth models are generated. A simulator replays users' visits to the portal web page and simulates their interactions with content items on the page based on the truth models. Various metrics are used to compare different content item-selecting algorithms. In the second kind of method, no explicit truth models are built. Events from the controlled serving scheme are replayed in part or whole; content item-selection algorithms learn using the observed user activities. Metrics that measure the overall predictive error are used to compare different content-item selection algorithms. The data collected in a controlled fashion plays a key role in both the methods.

31 Claims, 4 Drawing Sheets

U.S. PATENT DOCUMENTS

| | | | |
|---|---|---|---|
| 7,630,986 B1* | 12/2009 | Herz et al. ............................. 1/1 |
| 7,739,280 B2 | 6/2010 | Aravamudan et al. |
| 7,801,891 B2 | 9/2010 | Hu et al. |
| 7,809,740 B2* | 10/2010 | Chung et al. ................ 707/758 |
| 7,827,183 B2* | 11/2010 | Fraser et al. ................. 707/748 |
| 7,835,998 B2 | 11/2010 | Aravamudan et al. |
| 7,885,904 B2 | 2/2011 | Aravamudan et al. |
| 7,890,549 B2* | 2/2011 | Elad et al. ..................... 707/803 |
| 7,970,762 B2 | 6/2011 | Goronzy et al. |
| 8,005,833 B2 | 8/2011 | Adar et al. |
| 8,037,067 B1 | 10/2011 | Schnedler et al. |
| 8,301,623 B2 | 10/2012 | Chakrabarti et al. |
| 8,316,020 B1 | 11/2012 | Kleinmann |
| 2002/0013782 A1* | 1/2002 | Ostroff et al. .................. 707/10 |
| 2002/0062247 A1 | 5/2002 | Allen |
| 2003/0061239 A1 | 3/2003 | Yoon |
| 2003/0110181 A1 | 6/2003 | Schuetze et al. |
| 2007/0033531 A1* | 2/2007 | Marsh ........................... 715/738 |
| 2007/0260624 A1 | 11/2007 | Chung et al. |
| 2007/0266025 A1 | 11/2007 | Wagner et al. |
| 2008/0162399 A1* | 7/2008 | Tam et al. ........................ 706/59 |
| 2009/0024546 A1* | 1/2009 | Ficcaglia et al. ................ 706/12 |
| 2009/0037410 A1 | 2/2009 | Jones et al. |
| 2009/0138326 A1 | 5/2009 | Shi |
| 2009/0171763 A1 | 7/2009 | Doug et al. |
| 2009/0265290 A1 | 10/2009 | Ciaramita et al. |
| 2009/0299945 A1* | 12/2009 | Hangartner ..................... 706/50 |
| 2010/0030717 A1 | 2/2010 | Agarwal et al. |
| 2010/0241625 A1 | 9/2010 | Aravamudan et al. |
| 2010/0241639 A1* | 9/2010 | Kifer et al. .................... 707/754 |
| 2010/0293160 A1 | 11/2010 | Aravamudan et al. |
| 2011/0016121 A1 | 1/2011 | Sambrani et al. |
| 2011/0055209 A1 | 3/2011 | Novac et al. |

OTHER PUBLICATIONS

Current claims for PCT application No. PCT/US2010/041960, 4 pgs.
U.S. Appl. 12/504,527, filed Jul. 16, 2009, Office Action, mailing date Oct. 20, 2011.

\* cited by examiner

FRAMEWORK TO EVALUATE CONTENT DISPLAY POLICIES

FIELD OF THE INVENTION

The present invention relates to Internet portal web pages, and, more specifically, to techniques for evaluating the performance of different algorithms that use different approaches for selecting content items to be displayed on an Internet portal web page, or on a content publishing system on an Internal portal web page.

BACKGROUND

One way of making a portal page more enticing to potential visitors is by placing interesting information on that portal page. For example, one might try to entice users to access a portal page by including, on the portal page, interesting and current news stories. If visitors to the portal page learn, by experience, that the content shown on the portal page is likely to be of interest to those visitors, and that the content shown on the portal page is likely to be dynamic, updated, fresh, and current each time that those visitors access the portal page, then those visitors will likely want to access that page additional times in the future, and with greater frequency. Content items shown on the portal page might be associated with links which, when clicked on or otherwise activated by portal page visitors, direct those visitors' browsers to other resources on the Internet. A visitor's activation of a particular link that is associated with a displayed content item is indicative of that visitor's interest in that content item.

Alternatively, if visitors to the portal page discover, by experience, that the content shown on the portal page is likely to be the same static content that those visitors saw the last time that they visited the portal page, or if visitors to the portal page come to understand that the type of content that is shown on the portal page is a type of content in which they are not interested, then those visitors become more likely, in the future, to visit pages other than the portal page instead. This loss of visitor interest translates into a loss of advertising revenue for the owner of the Internet search engine for which the portal page serves as an interface.

A challenge to the maintainer of the portal page becomes how to choose, from among the multitude of content that could be presented on the portal page, content that is likely to attract the greatest number of visitors and thus increase advertising revenue. One approach for selecting content for presentation on the portal page might involve hiring a staff of full-time human editors to look for (and/or compile or otherwise produce) news stories and other content items that those editors believe will be interesting to those who visit the portal page. However, such editors are only human, and, as humans, are inherently biased towards their own tastes and preferences. The content that appeals to the editors might not be content that appeals to significant segments of the public. If an editor chooses to place, on the portal page, content that is not interesting to many visitors, or content that is unpopular or objectionable, then the business of the Internet portal's owner may suffer as a result. Additionally, maintaining a staff of qualified full time editors can require a significant and recurring monetary investment on the part of the owners of the Internet portal.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

Figure 1:
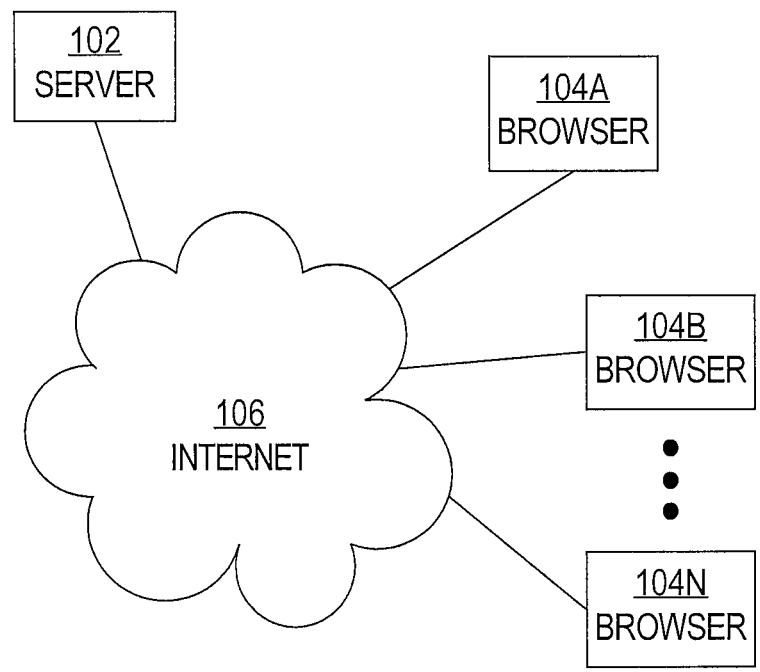
FIG. 1 is a block diagram that illustrates an example of a system in which embodiments of the invention may be implemented and practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A variety of different algorithms might be employed to select, from among a multitude of different candidate content items, particular content items (such as news stories and other textual articles, images, and multimedia content items) for presentation on a portal (or other) web page. Such algorithms can select the particular content items in a manner that is automated to at least some extent, requiring less human intervention. However, some algorithms may be more successful than other algorithms in selecting content items whose presentation on the portal page results in the highest increase, over a period of time, in some metric (such as page views of the portal page and/or click-through rate of links on the portal page).

One approach to determining which algorithm is the most successful might involve actually running several algorithms in a sort of "live test" or experiment to select, in real time, which content items will be shown to actual portal page visitors. Unfortunately, such an approach carries the risk that a particular algorithm might be very unsuccessful for a significant period of time, thereby causing actual visitors to lose interest in the portal page, and doing real damage to the business of the Internet portal owner. Additionally, there might not be adequate time to subject a significant number of different algorithms to live visitor traffic for any period of time that is long enough to gauge the successfulness of those algorithms. Small sample sizes are often not very informative.

According to techniques described herein, the successfulness and/or effectiveness (relative to some user-specified metric) of various content item-selecting algorithms is approximated without necessarily exposing actual portal web page visitors to the content items that those algorithms select. As actual users access the portal web page, mechanisms associated with the portal web page observe and record information about the various known characteristics (e.g., gender, age, geographical location, interests, etc.) of those users and information about the those user's activities (e.g., time of day of access, duration of visit, etc.). These mechanisms also observe and record information about the behaviors of those users relative to content items actually shown on the portal web page (e.g., identities of links on which the users click).

Embodiments of the invention include the capability to collect data about user activities in a controlled environment. Such a controlled environment might be, for example, (a) an environment in which users see content items that are picked randomly from a set of items, (b) an environment in which users see content items that are selected by an algorithm, or (c) an environment in which users see editorially selected content items.

Using this recorded information about the characteristics and behaviors of the users visiting the portal web page, probabilistic models of "truth" (or "user profile" models) may be generated for different users, or different segments of users. A single truth model can also be generated for all users. For example, the profile-generating mechanism might observe, from the recorded information about all of the visitors to the portal web page over a particular period of time, that all known males aged 18-35 clicked on content items that are associated with a "sports" category about 65% of the time that such content items were shown to those males aged 18-35. The profile-generating mechanism therefore can store profile information that predicts that, when a user is a male aged 18-35, there is a 65% probability that the user will click on a content item that is associated with a "sports" category if such a content item is presented to that user.

Potentially long after the recorded information has been obtained, a simulator mechanism automatically determines, possibly based on the previously recorded information about actual visitors to the portal web page, which content item(s) a particular algorithm would have selected for presentation to those visitors-content item(s) that might be different from the content item(s) that were actually presented to those visitors. The particular algorithm might base its content item selection on the recorded characteristics and/or behaviors of those visitors. For example, a sophisticated algorithm might be designed to select, from among a pool of different candidate content item, some content item that is associated with a "sports" category whenever the algorithm knows that the portal page visitor is a male user. For another example, a less sophisticated algorithm might be designed simply to select a content item at random without reference to any information known about that user to whom the content item will be presented. The number of different content item selection techniques that could be employed by various different algorithms is virtually limitless.

The simulator mechanism replays actual visits to the portal web page based on the previously recorded characteristic and behavioral information about actual users who visited the portal web page. Based on the appropriate user profile model (the truth model), the simulator mechanism simulates user activities. Such user activities may include (but are not limited to) mouse clicks on various positions within one or more web pages. Although it may be difficult to ascertain with absolute certainty whether an actual visitor would have clicked on a content item that a particular algorithm would have selected for that visitor (because the particular algorithm might select a content item that is different from the content item that was actually shown to that visitor), the simulator mechanism approximates, based on the visitor's known characteristics and the profile information that those characteristics match, what the visitor's likely behavior, relative to the algorithm-selected content item, would have been if the algorithm-selected content item had been presented to the visitor. For example, if the actual visitor was known to be a male aged 25, and if the profile information indicates that males aged 18-35 click on "sports" categorized content items about 65% of the time that those items are presented to those males, and if the algorithm selects, during the simulation, a content item that is associated with the "sports" category, then the simulator may generate a random value (e.g., in the range of 1-100) for the actual visitor, determine whether the random value is within the click probability (e.g., whether the value is 65 or less), and simulate, based on this determination, that the visitor clicks or does not click on the algorithm-selected content item.

Based on these simulated activities of users having real characteristics and behaviors, the effect of various different algorithms' content item selection techniques on various metrics (e.g., click-through-rate) can be measured. For example, the number of content item clicks produced as a result of each such algorithm's content item selection technique can be measured, and the different algorithms can be ranked relative to each other based on this measurement. Thus, the best known content-item selection algorithm to achieve a desired goal (e.g., highest click-through-rate) can be discovered and employed in real time in the future. Furthermore, the simulation process discussed above can be performed entirely "offline" so that actual real time visitors to a portal web page are not exposed to the simulation process.

An alternate way of evaluating which is used in this framework is by using the data obtained in a controlled fashion directly for evaluation without simulation. In this method, events from the controlled serving scheme are replayed in part or whole; and each of the content-item selection algorithms learns based on the observed user activities. The prediction accuracy of each algorithm is computed at periodic intervals during the replayed sequence, and is accumulated over the replayed sequence in part or whole. These accumulated metrics, which we call predictive metrics, can be used to compare different content-item selection algorithms. Again, the data collected in a controlled fashion plays a key role in the evaluation.

Other features that may be included in various different embodiments of the invention are discussed in more detail below.

Example System

FIG. 1 is a block diagram that illustrates an example of a system in which embodiments of the invention may be implemented and practiced. The system of FIG. 1 comprises a server 102, browsers 104A-N, and Internet 106. Alternative embodiments of the invention may include more, fewer, or different components that those illustrated in FIG. 1.

In one embodiment of the invention, browsers 104A-N execute on separate computers, such as desktop or laptop computers. However, in one embodiment of the invention, one or more of browsers 104A-N executes on a mobile device such as a mobile or cellular telephone. Such a cellular telephone may be equipped with a built-in camera that is capable of taking digital photographs, storing those photographs, and transmitting those photographs to other devices (such as server 102) over Internet 106.

Each of browsers 104A-N communicates with server 102 via Internet 106. For example, browsers 104A-N may send Hypertext Transfer Protocol (HTTP) requests to, and receive HTTP responses from, server 102 across Internet 106. These HTTP requests and responses may be transmitted according to a multi-level suite of network communication protocols, typically including Transfer Control Protocol (TCP) and Internet Protocol (IP). Each of browsers 104A-N may be used by a different user. Browsers 104A-N may be widely distributed over the entire Earth. Using browsers 104A-N, users of browsers 104A-N specify the URL that is associated with a web page (e.g., the gallery web page discussed above) that server 102 stores or dynamically generates. In response to these users specifying the URL, browsers 104A-N request, over Internet 106, from server 102, the web page that is associated with that URL. Server 102 receives these requests and dynamically generates and sends the requested web page to browsers 104A-N over Internet 106 in response.

In one embodiment of the invention, users of browsers 104A-N use browsers 104A-N to access a portal web page that is served by server 102. In one embodiment of the invention, server 102 is, or comprises, a web server. In one embodiment of the invention, the functionality of server 102 is provided instead by multiple separate servers to which the requests of browsers 104A-N are distributed by a load-balancing device that receives those requests. In response to requests from browsers 104A-N for the portal web page, server 102 sends the portal web page over Internet 106 to browsers 104A-N. The portal web page typically contains one or more content items that were selected from a pool of available content items. The content items presented in the portal web page might be selected from the pool by human editors in a manual manner, and/or by an algorithm in an automated manner. In response to receiving the portal web page from server 102, browsers 104A-N display the portal web page.

In one embodiment of the invention, server 102 dynamically generates at least portions of the portal web page in response to each request from browsers 104A-N. In one embodiment of the invention, the version of the portal web page that server 102 sends to various ones of browsers 104A-N differs from the version that server 102 sends to other ones of browsers 104A-N. For example, the version of the portal web page sent to browser 104A might contain different selected content items than the version of the portal web page sent to browser 104B.

In one embodiment of the invention, whenever any of browsers 104A-N sends a request to server 102, server 102 determines whether a "cookie" is stored by that browser. If server 102 determines that no cookie is stored by that browser, then server 102 instructs that browser to store a cookie that contains an identifier that is chosen by server 102 to be unique among identifiers contained in cookies that server 102 instructs browsers 104A-N to store. Thus, different ones of browsers 104A-N may store different cookies that contain different identifiers chosen by server 102; no two of browsers 104A-N store a cookie with the same identifier. Thus, each cookie and identifier specified therein represents a different user.

Alternatively, if server 102 determines that the browser does already store a cookie that server 102 previously instructed that browser to store, then server 102 requests the identifier that is stored in that cookie. The browser sends the identifier to server 102 in response. As a result, server 102 is able to identify which user, or which one of browsers 104A-N, has sent the request to server 102.

In one embodiment of the invention, for each identifier of the kind discussed above, server 102 maintains a mapping between that identifier and a set of characteristic and behavior data for a user that is associated with that identifier. In response to receiving requests from a browser that stores a cookie with a particular identifier, server 102 may responsively update the set of characteristic and behavior data that is associated with the particular identifier. Server 102 may update the information based on the resources (e.g., web pages) that the user requests, on the values that the user supplies, on the links (e.g., links associated with presented content items) on which the user clicks or otherwise activates, and/or on any other actions that the user takes relative to any data that server 102 presents to the user via that user's browser.

Thus, as each user of any of clients 104A-N interacts with the resources that server 102 provides, server 102 may maintain a growing store of information about the user's behaviors and characteristics. Server 102 may learn this information by observation and/or by asking the user to supply certain characteristic data. For example, server 102 may send, to one of browsers 104A-N, a web page that contains a fillable Hypertext Markup Language (HTML) form that requests various characteristic data pertaining to the user (e.g., the user's gender, the user's age, the user's geographic location, etc.). In one embodiment of the invention, server 102 maintains the identifier-to-user data mapping and the user data in a relational database that is persistently stored on a non-volatile computer-readable storage medium such as a hard disk drive. The user data that is mapped to an identifier may include one or more activity logs.

In one embodiment of the invention, each content item that is selected for display on the portal web page is associated with one or more categories. For example, a particular content item that is a news story about a well-known athlete might be associated with a "sports" category. For another example, a particular content item that is a news story about an actor who is going to appear in an upcoming movie might be associated with an "entertainment" category. Various techniques exist for associating content item with categories. One such technique involves a human editor inspecting the content item and choosing one or more categories to which that the human editor think that the content item pertains. Another such technique involves a computer-executed process automatically examining the words contained in a content item and choosing one or more categories that are usually associated with those words. Other category assignment techniques, not specifically disclosed herein, also may be employed to associate content items with categories. The categories with which each content item is associated may be stored in a relational database maintained by server 102.

In one embodiment of the invention, a computer-executed process (which may execute on server 102 or on any computer that has access to the user behavior and characteristic data which server 102 has gathered and stored) processes the user behavior and characteristic data to generate probabilistic models of "user profiles." This computer-executed process is called a profile generator. The profile generator may automatically generate a different user profile model for each possible combination of attributes that are specified in the user characteristic data, although, in at least one embodiment of the invention, it is not necessary to generate a user profile model for every possible combination of attributes. For example, by examining the behavior data that is associated only with users whose characteristic data indicates that they are male and aged somewhere in the range of 18-35, the profile generator may determine that, during a particular time period, content items that are associated with the "sports" category were presented 100,000,000 times to these users, and that these users collectively clicked on those content items 65,000,000 times. The profile generator may derive, from this data, a model of a user whose characteristics are "male," "aged 18-35," and whose behavioral characteristics indicate a 65% probability that a user having those characteristics will click on any content item that associated with the "sports" category if such a content item is presented to that user in the portal web page. The attributes selected for a user profile model may include (a) attributes that the user expressly indicated (e.g., gender, age, income, etc.), (b) attributes that server 102 observed (e.g., time of day of access, geographic location deduced from IP address, identities of resources that the user requested from server 102, etc.) without the user's express indication, or both. Ranges for certain ones of these attributes may be manually specified for a user profile model (e.g., ages in the range of 18-35). In one embodiment of the invention, because of the uncertainty in any simulation, several simulations are run. A final metric can be obtained using a confidence interval (e.g., a $95^{th}$ confidence interval) of the empirical distribution of the observed simulation results.

In one embodiment of the invention, a computer-executed process called the "simulator" executes on server 102 or on some other computer that has access to (a) the user profile models generated by the profile generator and (b) the stored user characteristic and behavior data that server 102 previously gathered. In one embodiment of the invention, the simulator loads a particular content item-selection algorithm that is taken from a pool of different content item-selection algorithms; the particular content item-selection algorithm is the algorithm that the simulator will test. The simulator may test different content item-selection algorithms at different times. The simulator reads the user characteristic and behavior data that server 102 previously gathered. As is discussed above, this data indicates, among other information, the known characteristics of the users who actually accessed the portal web page during a particular period of time.

In one embodiment of the invention, the simulator is implemented using the "Grid," which is a distributed system containing a large number of machines that are used for processing large amounts of data. Using the Grid, multiple simulations can be run in parallel. For example, hundreds of simulations may be run in parallel on hundreds of different machines.

In one embodiment of the invention, for each user who accessed the portal web page during that time period, as indicated in the user characteristic and behavior data, the simulator determines which of the user profile models the user's known characteristics match. For example, if a user is known to be male and to be age 23, then the simulator may determine that the user matches the "male aged 18-35" user profile model. A user may match multiple user profile models.

In one embodiment of the invention, for each user who accessed the portal web page during the particular time period, the simulator invokes the particular content item-selection algorithm that is currently being tested. In response, the particular content item-selection algorithm uses whichever technique that algorithm was designed to use in order to select one or more simulated-to-be-presented content items from a pool of multiple different content items. The simulated-to-be-presented content item(s) are considered to be the content item(s) that are presented, via the portal web page, to the user in the simulation. As is discussed above, each such content item is associated with one or more categories. For each user profile model that the user matches, the simulator reads, from that user profile model, a probability that the matching user will click on a content item that is associated with a category with which a simulated-to-be-presented content item belongs. The simulator then simulates, based on the probability, whether the user actually does click on the simulated-to-be-presented content item in the simulation. For example, the simulator may generate a random number in the range of 1 to 100, and, if the number is not higher than the probability that is associated with the simulated-to-be-presented content item, then the simulator may record simulated behavior information that indicates that the user clicked on the simulated-to-be-presented content item. Alternatively, if the number is higher than the probability that is associated with the simulated-to-be-presented content item, then the simulator may record simulated behavior information that indicates that the user did not click on the simulated-to-be-presented content item. In an alternative embodiment of the invention, instead of using a single probability from a user profile, the system samples the probability from a distribution. It is reasonable to assume that such a distribution is Normal, with parameters derived from the samples. In one such embodiment of the invention, the number of simulations is increased in order to get more reliable estimates.

Thus, in one embodiment of the invention, the simulator generates a separate set of simulated behavior information for each content item-selection algorithm in the pool of content item-selection algorithms. This simulated behavior information may be examined to determine which the other content item-selection algorithms produced simulated behavior information that indicated the greatest number of clicked-on simulated-to-be-presented content items. The content item-selection algorithm that produced the greatest number of clicked-on simulated-to-be-presented content items may be used to select, automatically, content items that will actually be presented, in the portal web page, to users who access the portal web page thereafter.

Example Algorithm Simulation and Evaluation Technique

Figure 2:
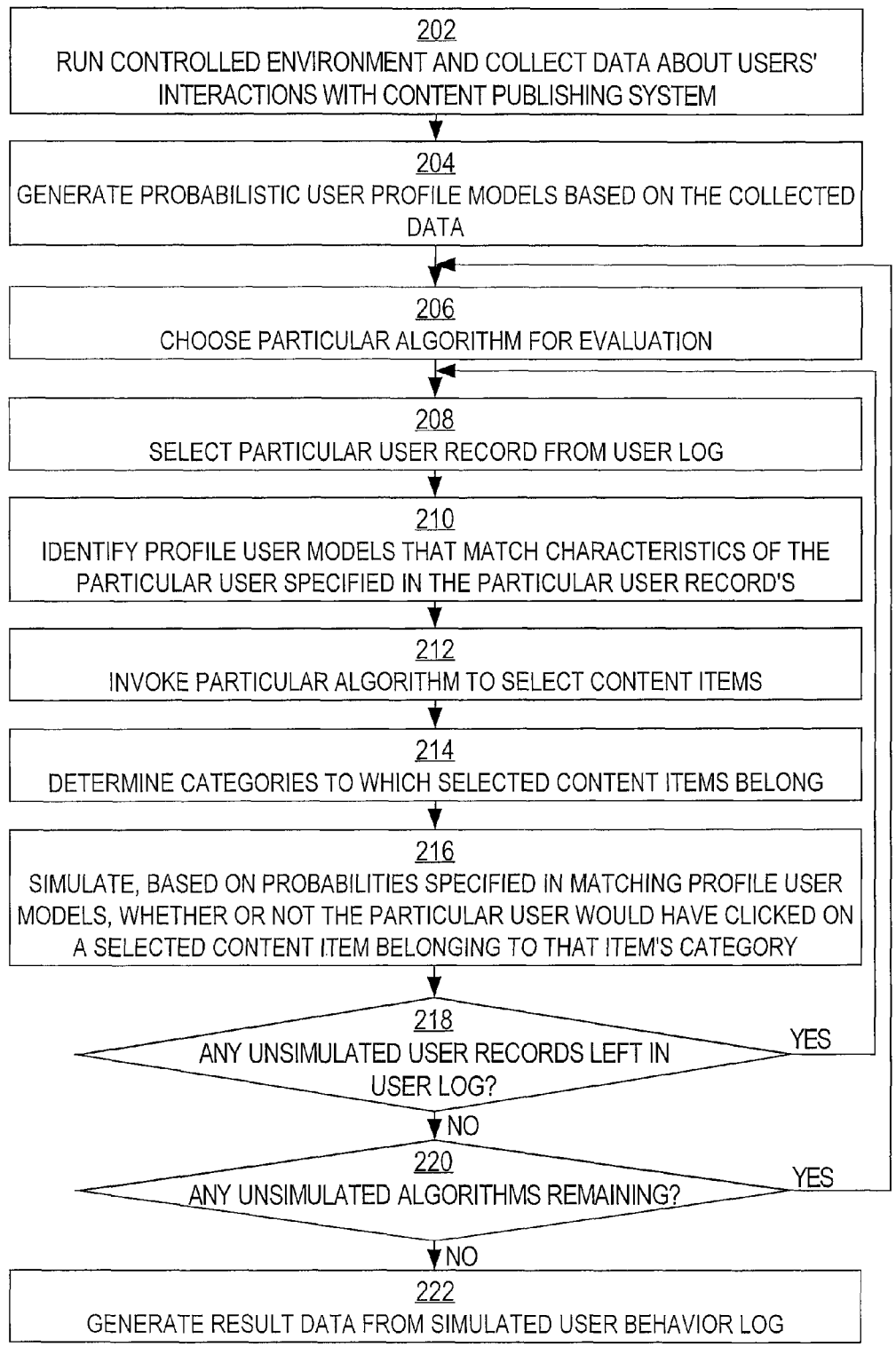
FIG. 2 is a flow chart that illustrates an example of a gallery web page that a server may serve to an Internet browser, according to an embodiment of the invention.

FIG. 2 is a flow diagram that illustrates an example of a technique for automatically evaluating content item-selecting algorithms, according to an embodiment of the invention. Although the example shown includes certain steps, alternative embodiments of the invention may include fewer, additional, or different steps than those shown in FIG. 2.

In block 202, a controlled environment is run. In this environment, data about users' interactions with a content publishing system are collected. In one embodiment of the invention, as users access a portal web page (an example of part of a content publishing system), information about various known characteristics (e.g., gender, age, geographical location, interests, etc.) of those users and information about the those user's activities (e.g., time of day of access, duration of visit, etc.) are recorded. Additionally, information about the behaviors of those users relative to content items (e.g., news stories, images, videos, links, etc.) actually shown on the portal web page (e.g., identities of links on which the users click) are recorded. In one embodiment of the invention, the characteristics and behaviors (which may include behaviors relative to web pages other than the portal web page) of the portal web page visitors are stored in records in a user log.

Figure 3:
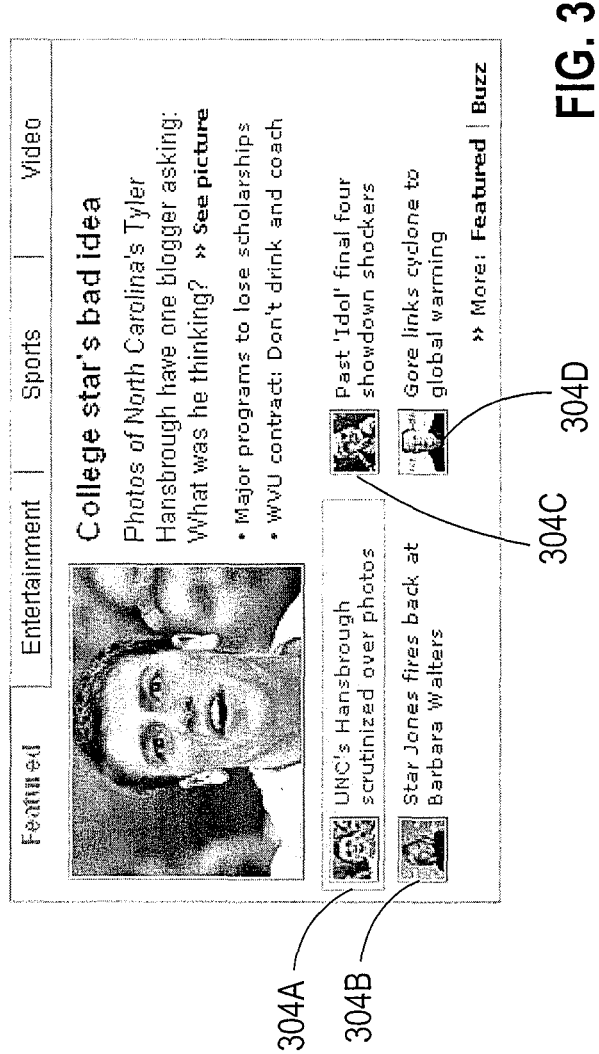
FIG. 3 illustrates a portion of an example portal web page, according to an embodiment of the invention.

FIG. 3 illustrates a portion of an example portal web page, according to an embodiment of the invention. The portion includes presented content items 304A-D. In the example illustrated, each of content items 304A-D pertains to a different news story. Content item 304A is currently highlighted, so that more detailed information about content item 304A appears prominently above content items 304A-D. In one embodiment of the invention, a user's selection (via a mouse click) of any one of content items 304A-D causes the identity of that content item and known characteristic information about the user that clicked on that content item to be stored persistently on a computer-readable storage medium.

Referring again to FIG. 2, in block 204, one or more probabilistic models of user profiles are generated automatically based on the recorded characteristics and behaviors of the users visiting the portal web page. Each probabilistic model is associated with one or more user characteristics. Each probabilistic model indicates, for each of one or more categories (e.g., sports, entertainment, etc.) of content items that may be displayed on the portal web page, a probability that a user who has the model's characteristics will click on or otherwise activate a link that is associated with a content item that belongs to that category. Additionally or alternatively, each probabilistic model may indicate, for each of one or more features of such content items, a probability that a user who has the model's characteristics will click on or otherwise interact with a link that is associated with a content item that has those features. Each probabilistic model is generated from the observed behaviors of users with known characteristics relative to categorized content items that actually were shown to those users on the portal web page. The operations of block 204 and the following blocks may be performed "offline," potentially long after the users visit the portal web page in block 202. In one embodiment of the invention, rather than determining a single probability that users having certain characteristics will click on a content item belonging to a certain category, a range of probabilities (e.g., 6% to 9%) is determined instead.

In block 206, a particular content item-selecting algorithm is chosen for evaluation. For example, there may be a pool of dozens of different algorithms that automatically select content items to be presented to users on a portal web page. Each algorithm may select content items based on different criteria. The evaluation process discussed below may be performed separately relative to each of those algorithms.

In block 208, a particular user record is selected from the user log in which the user behaviors and characteristics were recorded. For example, the user log might contain thousands of different user records pertaining to users who actually visited the portal web page during a particular period of time. Among other information, each record may identify the user's known characteristics, the identities of the content items (and/or the categories thereof) that were actually presented, on the portal web page, to the user, and the identities of the content items (and/or the categories thereof) that the user actually clicked on, if any. The simulation process discussed below may be performed separately relative to each of the user records in the user log.

In block 210, one or more matching user profile models whose characteristics match the characteristics recorded in the particular user record are identified. The characteristics in the particular user record might match some user profile models, but might not match other user profile models. Thus, a set of matching user profile models into which an actual previous visitor to the portal web page "fits" are determined automatically.

In block 212, the particular content item-selecting algorithm, chosen to be evaluated in block 206, is invoked to simulate the automatic selection of one or more content items (from a pool of available content items) for simulated presentation to the user corresponding to the particular user record. The particular content item-selecting algorithm may, but does not necessarily need to, base its selection of content items on the known characteristics of the user corresponding to the particular user record. As a result of the operations of block 212, one or more algorithm-selected content items are identified. These are the content items that the particular content item-selecting algorithm would have selected if the particular content item-selecting algorithm had been the selector of content items at the time that the user actually visited the portal web page. A simulation record, which indicates an identity of the particular algorithm and identities of the content items that the particular algorithm would have selected for the user, may be added to a stored simulation log.

In block 214, the categories to which the algorithm-selected content items belong are determined. Each content item in the pool of available content items may be associated, beforehand, with one or more categories. These categories may be specified in stored metadata that is associated with each content item, for example. In one embodiment of the invention, other features of the algorithm-selected content items are also determined. Such features may include, for example, the titles of the items, the body words of the items, image and media features associated with the items, names entities represented by or within the items, etc.

In block 216, for each of the one or more algorithm-selected content items, the behavior of the particular user record's corresponding user relative to that selected content item is simulated. In one embodiment of the invention, for each of the algorithm-selected content items, a determination is made as to whether the user would have clicked on the selected content item had that content item been presented to the user on the content web page. As is discussed above, in one embodiment of the invention, this determination is made by generating a random value and comparing that value to the probability that is associated with the algorithm-selected content item's category in the matching user profile identified in block 204. The determination is essentially based on the observation that many users having characteristics similar to the particular user record's user actually did click on content items belonging to certain categories, and, therefore, the particular user record's user probably would have clicked on content items belonging to those certain categories as well, if those content items actually had been presented to the user. The product of the simulation may be information that indicates, for each algorithm-selected content item, whether the user clicked on the algorithm-selected content item in the simulation. In one embodiment of the invention, this information is stored in the simulation log.

In block 218, a determination is made as to whether any further user records, in relation to whose corresponding users the foregoing simulation has not yet been conducted, are contained in the user log discussed above with reference to block 208. If one or more other such user records exist in the user log, then control passes back to block 208, in which another user record is selected from the user log for simulation relative to the particular content item-selecting algorithm previously chosen for evaluation. Alternatively, if no user records corresponding to users whose behaviors have not yet been simulated relative to the particular content item-selecting algorithm remain in the user log, then control passes to block 220.

In block 220, a determination is made as to whether any further content item-selecting algorithm, which has not yet been simulated as described above, remains in the pool of content item-selecting algorithms that are to be simulated and evaluated. If one or more other such algorithms exist, then control passes back to block 206, in which another content item-selecting algorithm is chosen for simulation. Alternatively, if no further content item-selecting algorithms remain to be simulated, then control passes to block 222.

In block 222, result data for each of the simulated content item-selecting algorithms is generated from the information stored in the simulation log. The result data may be stored in one or more files for later examination by human technicians, for example. The result data may indicate, for each algorithm, how many clicks on the simulated-as-presented content items selected by that algorithm were registered from the simulated user encounters with those content items. The algorithm that produced the highest number of simulated clicks on content items may be chosen to select, automatically, content items for presentation on the portal web page to actual users who will visit the web page in the future.

In the embodiment described above, the result data contains and describes information related to a number of clicks on simulated-as-presented content items. However, in alternative embodiments of the invention, the result data may contain and describe other information in addition to or instead of the number of clicks. The kind of information stored in the simulation log may be adapted in order to evaluate different content item-selecting algorithms' performance in relation to any number of different conceivable goals (a high click-through rate being just one such goal).

Simulating in the Context of Business Rules

In one embodiment of the invention, a content item-selecting algorithm's operations are constrained, during the simulation discussed above, by one or more user-specified business rules. These rules may be specified according to some formal language and stored in a computer-readable file, for example. At the time that an algorithm is simulated, the simulator may load the business rules and ensure that the algorithm's operations conform to the limits specified by those rules.

For example, each algorithm in a set of content item-selecting algorithms might select content items without any regard to whether a particular user has already seen a particular content item. However, in one embodiment of the invention, a human user may specify a business rule that declares that if a particular content item has already been shown to a user, then that content item cannot be shown to the user again; some other content item should be chosen for display to the user under such circumstances. In such an embodiment of the invention, if, during the simulation, an algorithm selected, for simulated display to a user, a content item that had already been displayed to that user (during the simulation) due to that user having multiple records in the user log (corresponding to multiple actual visits by the user to the portal web page), then the simulator would detect the violation of a business rule. In response to detecting the violation of the business rule, the simulator causes the algorithm to repeat the operation of selecting a content item, until the algorithm has selected a content item whose selection does not violate any of the specified business rules.

Beneficially, the feature described above allows the operator of an Internet portal, or other content publishing system, to simulate the effects that certain business rule constraints will have on content item selection. Without such simulation, it might be difficult or impossible for an operator to predict what effects business rule constraints might have on the system.

Hardware Overview

Figure 4:
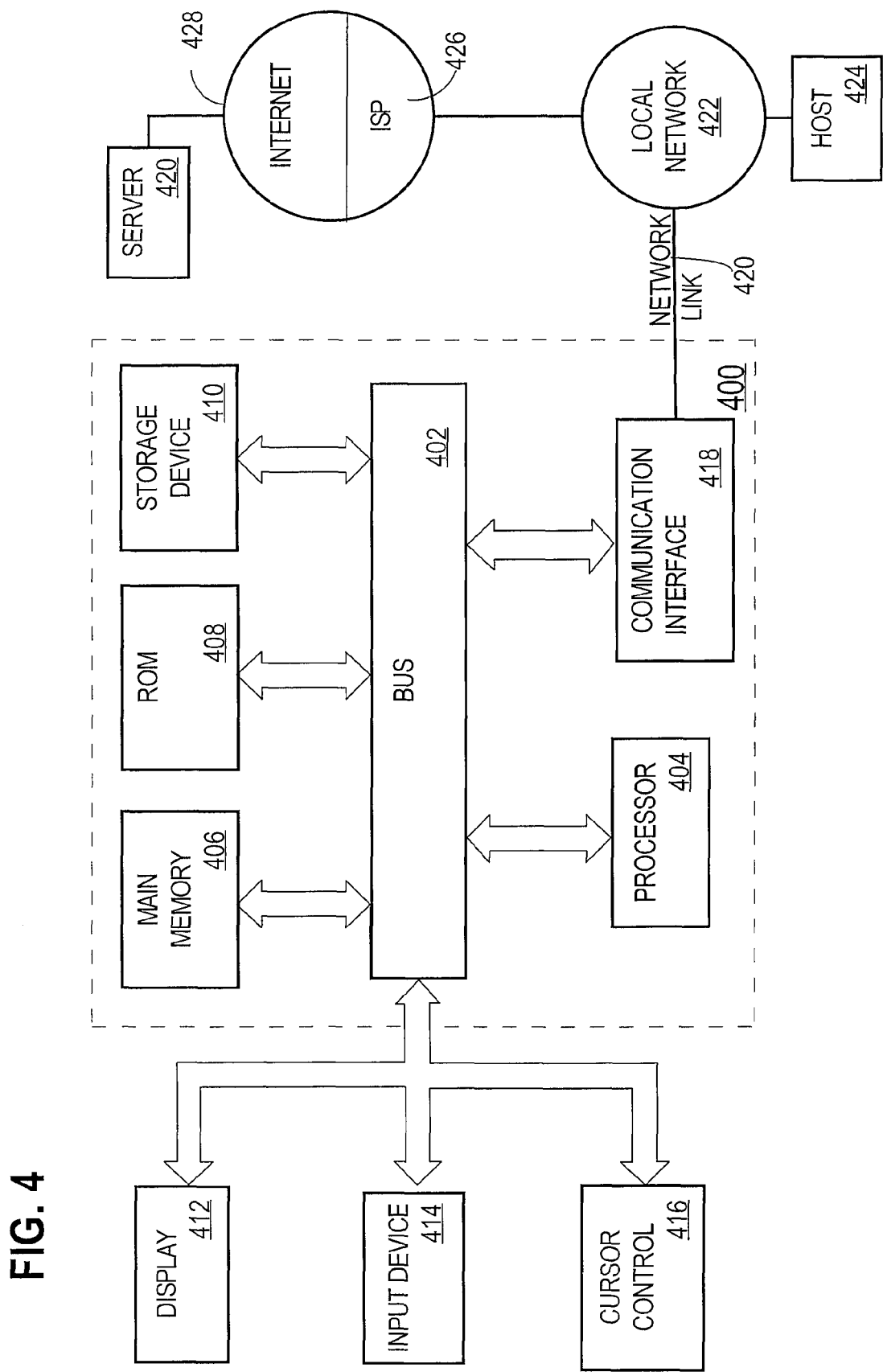
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 450 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
collecting data about user activities;
wherein, the data include behavior information that indicates how each user, of a set of users, interacted with content items on a web portal during a particular period of time;
generating, based on at least some of the collected data, a plurality of user profile models, wherein each user profile model, of the plurality of user profile models, at least indicates a probability that users that match the user profile model will interact with a content item, on the web portal, having certain characteristics;
evaluating a plurality of content-selection algorithms, wherein each particular content-selection algorithm, of the plurality of content-selection algorithms, implements a different approach for selecting content items to display on the web portal, wherein each particular content-selection algorithm is not a user profile model;
wherein evaluating the plurality of content-selection algorithms comprises, for each particular content-selection algorithm of the plurality of content-selection algorithms:
using the particular content-selection algorithm to identify one or more sets of content items for display on a simulated web portal;
based on the plurality of user profile models, and at least some of the data about the user activities, simulating visits to the simulated web portal, in which simulated users select one or more content items from the identified one or more sets of content items; and
generating simulation data indicating content-item selections during the simulated visits;
wherein evaluating the plurality of content-selection algorithms further comprises, based on the simulation data from the simulated visits, computing performance metrics that measure a predicted effectiveness, of each particular content-selection algorithm of the plurality of content-selection algorithms, in choosing content items with which users will interact on the web portal;
wherein the method is performed by one or more computing devices.

2. The method of claim 1, wherein the web portal is generated by a content publishing system which selects one or more content items for display on the web portal in accordance with at least a particular content-selection algorithm of the plurality of content-selection algorithms.

3. The method of claim 1, further comprising simulating how a particular user interacts with a particular set of one or more content items selected using a particular content-selection algorithm of the plurality of content-selection algorithms, wherein the simulating is performed without ever actually presenting the particular set of one or more content items to the particular user.

4. The method of claim 1, wherein the step of collecting data comprises storing at least one of: (a) a gender of a user, (b) an age of a user, (c) a geographical location of a user, (d) one or more interests of a user, (e) information about previous user activities in relation to a web page of the content publishing system, (f) information about a user's previous activities in relation to several web pages of a web portal, (g) information about a user's activities off other portals and networks, or (h) information about a user's social network.

5. The method of claim 1, wherein the step of collecting data comprises storing at least one of: (a) information that indicates a time of day that a user accessed a web page, (b) information that indicates a duration of time that a user viewed the web page, or (c) information that identifies links that are both on the web page and on which a user clicked.

6. The method of claim 1, a user profile model of the plurality of user profile models includes one or more of: (a) user characteristics, (b) content characteristics of content items requested by the user, including one or more of: content item identifiers, title keywords and/or phrases, content keywords and/or phrases, named entities, or content categories, (c) context information for activities taken by the user, including one or more of a position of a content item selected by the user on the web portal at the time of the content item being selected, the time when the user selected the content item, or other articles displayed on the web portal at the time.

7. The method of claim 1, wherein the probability is based on a ratio of (a) how many of the users also clicked, during a particular period of time, on a content item having the certain characteristics, to (b) how many of the users accessed the web portal during the particular period of time.

8. The method of claim 1, further comprising evaluating actual effectiveness of one or more content item-selection algorithms of the plurality of content-selection algorithms based on future data collected about user activities, wherein the actual effectiveness of the one or more content item-selection algorithms is measured cumulatively over several time intervals.

9. A non-transitory computer-readable storage medium storing one or more sequences of instructions which, when executed by one or more processors, cause the one or more processors to perform the steps recited in claim 8.

10. The method of claim 1, wherein evaluating the plurality of content-selection algorithms further comprises:
for each particular user of at least a subset of the set of users, determining which particular user profile model, of the plurality of user profile models, that the particular user's characteristic information matches, and simulating, based at least in part on the probability specified by the particular user profile model, how the particular user interacts with different sets of content items selected using different content-selection algorithms in the simulated visits to the simulated web portal.

11. The method of claim 1,
wherein the data collected about the user activities comprises a log of previous visits to the web portal during a particular period of time;
wherein simulating the visits comprises, for each previous visit of the previous visits, matching the previous visit to a particular user profile model and simulating, based the user profile model, how a user matching the particular profile model would have interacted with different sets of content items selected different content-selection algorithms, of the plurality of content-selection algorithms.

12. The method of claim 1, wherein identifying the one or more sets of content items comprises associating each set of content items of the one or more sets of content items with ordering information indicating at which position each content item in the sets of content items would have been displayed in the simulated web portal, wherein simulating the visits is also based on the ordering information.

13. The method of claim 1, wherein simulating the visits comprises:
tracking a particular content item that was selected during a first simulated visit for a particular simulated user;
preventing the particular content item from being selected during a second simulated visit for the particular simulated user.

14. The method of claim 1, further comprising evaluating the plurality of content-selection algorithms by simulating visits repeatedly over time, wherein the performance metrics are based on repeatedly simulating the visits.

15. The method of claim 1, wherein simulating the visits comprises constraining the visits by certain business rules, whereby the predicted effectiveness of each particular content-selection algorithm of the plurality of content-selection algorithms is evaluated relative to the certain business rules.

16. The method of claim 1, wherein simulating a particular visit of the simulated visits comprises determining whether a particular simulated user, matching a particular user profile model, selects a particular content item at a particular position within the simulated web portal based on at least on a randomly selected number and a particular probability associated with the particular content item and the particular user profile model.

17. A non-transitory computer-readable storage medium storing one or more sequences of instructions which, when executed by one or more processors, cause the one or more processors to perform the steps recited in claim 1.

18. A non-transitory computer-readable storage medium storing one or more sequences of instructions which, when executed by one or more processors, cause the one or more processors to perform the steps recited in claim 2.

19. A non-transitory computer-readable storage medium storing one or more sequences of instructions which, when executed by one or more processors, cause the one or more processors to perform the steps recited in claim 3.

20. A non-transitory computer-readable storage medium storing one or more sequences of instructions which, when executed by one or more processors, cause the one or more processors to perform the steps recited in claim 4.

21. A non-transitory computer-readable storage medium storing one or more sequences of instructions which, when executed by one or more processors, cause the one or more processors to perform the steps recited in claim 5.

22. A non-transitory computer-readable storage medium storing one or more sequences of instructions which, when executed by one or more processors, cause the one or more processors to perform the steps recited in claim 6.

23. A non-transitory computer-readable storage medium storing one or more sequences of instructions which, when executed by one or more processors, cause the one or more processors to perform the steps recited in claim 7.

24. A non-transitory computer-readable storage medium storing one or more sequences of instructions which, when executed by one or more processors, cause the one or more processors to perform the steps recited in claim 10.

25. A non-transitory computer-readable storage medium storing one or more sequences of instructions which, when executed by one or more processors, cause the one or more processors to perform the steps recited in claim 11.

26. A non-transitory computer-readable storage medium storing one or more sequences of instructions which, when executed by one or more processors, cause the one or more processors to perform the steps recited in claim 12.

27. A non-transitory computer-readable storage medium storing one or more sequences of instructions which, when executed by one or more processors, cause the one or more processors to perform the steps recited in claim 13.

28. A non-transitory computer-readable storage medium storing one or more sequences of instructions which, when executed by one or more processors, cause the one or more processors to perform the steps recited in claim 14.

29. A non-transitory computer-readable storage medium storing one or more sequences of instructions which, when executed by one or more processors, cause the one or more processors to perform the steps recited in claim 15.

30. A non-transitory computer-readable storage medium storing one or more sequences of instructions which, when executed by one or more processors, cause the one or more processors to perform the steps recited in claim 16.

31. A system comprising:
- one or more computing devices executing a web server that is configured to:
  - receive requests from users;
  - provide, in response to the requests, web pages of a web portal; and
  - generate user logs of behavior information during user visits to the web portal, each of the user visits being associated with characteristic information about a user that is visiting the web portal;
- a content management system configured to select sets of content items to display on the web portal based on one or more content-selection algorithms of a plurality of content-selection algorithms;
- wherein each particular content-selection algorithm, of the plurality of content-selection algorithms, implements a different approach for selecting content items to display on the web portal;
- a user profiling component configured to generate, based on at least some of the user logs, a plurality of user profile models, wherein each user profile model of the plurality of user profile models at least indicates probabilities that users that match the user profile model will interact with certain types of content items on the web portal;
- a simulation component configured to simulate visits to the web portal by for each particular content-selection algorithm of the plurality of content-selection algorithms:
  - using the particular content-selection algorithm to identify one or more sets of content items for display on a simulated web portal;
  - based on the plurality of user profile models, and at least some of the data about the user activities, simulating visits to the simulated web portal, in which simulated users select one or more content items from the identified one or more sets of content items; and
  - generating simulation data indicating content-item selections during the simulated visits;
- an algorithm evaluation component configured to, based on the simulation data from the simulated visits, compute performance metrics that measure a predicted effectiveness, of each particular content-selection algorithm of the plurality of content-selection algorithms, in choosing content items with which users will interact on the web portal.

* * * * *